United States Patent
Amir et al.

(10) Patent No.: US 9,727,287 B2
(45) Date of Patent: Aug. 8, 2017

(54) DATA TRANSFER SYSTEM, METHOD OF TRANSFERRING DATA, AND SYSTEM

(71) Applicant: Hewlett-Packard Indigo, B.V., Amstelveen (NL)

(72) Inventors: Gideon Amir, Ness Ziona (IL); Noam Shaham, Ness Ziona (IL); Lior Krasnovsky, Ness Ziona (IL); Gershon Alon, Ness Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/782,760

(22) PCT Filed: Apr. 10, 2013

(86) PCT No.: PCT/EP2013/057472
§ 371 (c)(1),
(2) Date: Oct. 6, 2015

(87) PCT Pub. No.: WO2014/166531
PCT Pub. Date: Oct. 16, 2014

(65) Prior Publication Data
US 2016/0041802 A1    Feb. 11, 2016

(51) Int. Cl.
*G06F 3/12* (2006.01)
*G06K 15/02* (2006.01)

(52) U.S. Cl.
CPC .......... *G06F 3/1276* (2013.01); *G06F 3/1206* (2013.01); *G06F 3/1244* (2013.01); *G06F 3/1275* (2013.01); *G06F 3/1285* (2013.01)

(58) Field of Classification Search
None
See application file for complete search history.

(56) References Cited

U.S. PATENT DOCUMENTS 4,965,763 A  * 10/1990  Zamora ............... G06F 17/3061
                                                    704/1
4,970,554 A  * 11/1990  Rourke ................ G03G 15/507
                                                   101/DIG. 37
5,051,779 A      9/1991  Hikawa
(Continued)

FOREIGN PATENT DOCUMENTS

CN          1605081       4/2005
CN         101216828      7/2008
(Continued)

OTHER PUBLICATIONS

IBM, "Printers and Printing", AIX Version 6.1, Oct. 2009, 254 Pages. http://publib.boulder.ibm.com/infocenter/pseries/v5r3/topic/com.ibm.aix.printergd/doc/printrgd/printrgd_pdf.pdf.
(Continued)

*Primary Examiner* — Beniyam Menberu
(74) *Attorney, Agent, or Firm* — HP Inc. Patent Department (57) ABSTRACT

A data transfer system includes a virtual printer driver to receive a report from a first system, the report in the form of a print job, and to generate an electronic document representative of the report; and an extraction module to extract a parameter from the electronic document, format the parameter in a first format, and provide the parameter in the first format to a second system.

12 Claims, 6 Drawing Sheets

(56) References Cited

U.S. PATENT DOCUMENTS

| | | | | |
|---|---|---|---|---|
| 6,336,094 B1* | 1/2002 | Ferguson | ............ | G06K 9/2054 |
| | | | | 705/35 |
| 7,394,558 B2 | 7/2008 | Stringham | | |
| 8,319,999 B2 | 11/2012 | Hanaoka et al. | | |
| 8,755,595 B1* | 6/2014 | Bissacco | ............ | G06K 9/6256 |
| | | | | 382/159 |
| 2004/0240738 A1* | 12/2004 | Nakajima | ......... | G06K 9/00469 |
| | | | | 382/185 |
| 2005/0286065 A1* | 12/2005 | Gauthier | ............ | G06F 17/211 |
| | | | | 358/1.13 |
| 2006/0023244 A1* | 2/2006 | Mitsui | ................ | G06F 3/1205 |
| | | | | 358/1.13 |
| 2006/0136411 A1* | 6/2006 | Meyerzon | ........ | G06F 17/30684 |
| | | | | 707/5 |
| 2006/0143154 A1* | 6/2006 | Jager | ............... | G06F 17/30011 |
| | | | | 707/1 |
| 2007/0019233 A1* | 1/2007 | Rai | .................. | G06F 3/1208 |
| | | | | 358/1.15 |
| 2007/0139692 A1* | 6/2007 | Martin | ............... | G06Q 10/06 |
| | | | | 358/1.15 |
| 2007/0206884 A1* | 9/2007 | Kato | ...................... | G06K 9/72 |
| | | | | 382/305 |
| 2011/0075194 A1 | 3/2011 | Tse et al. | | |
| 2011/0080604 A1* | 4/2011 | Liu | ...................... | G06F 3/1204 |
| | | | | 358/1.13 |
| 2012/0092720 A1 | 4/2012 | Jaudon et al. | | |
| 2012/0183211 A1* | 7/2012 | Hsu | ................... | G06K 9/00449 |
| | | | | 382/164 |
| 2012/0250076 A1 | 10/2012 | Kumar et al. | | |
| 2013/0016389 A1* | 1/2013 | Robinson | ............ | G06F 3/1206 |
| | | | | 358/1.15 |
| 2013/0050750 A1* | 2/2013 | Kawasaki | ............ | G06F 3/1206 |
| | | | | 358/1.15 |

FOREIGN PATENT DOCUMENTS

| | | |
|---|---|---|
| CN | 102207837 | 10/2011 |
| CN | 102681804 | 9/2012 |
| EP | 0366425 | 5/1990 |

OTHER PUBLICATIONS

International Search Report and Written Opinion dated Dec. 5, 2013 issued on PCT Patent Application No. PCT/EP2013/057472 dated Apr. 10, 2013, European Patent Office.

* cited by examiner

| JOB No: 12345 | Required By: 18 May 2013 14:00 | Quantity: 750 |
|---|---|---|

| Customer: Company X, Ltd. | Contact: John Doe<br>Email: jdoe@example.com |
|---|---|

| Method | Account Handler: Jane Doe<br>Estimator: David Brown |
|---|---|
| Print on 250 gsm Uncoated 100% Recycled.<br>To produce 750 4pp A4 sheets out of 460X320.<br>750 stock sheets.<br>Packed in 200's.<br><br>Print on 120 gsm Uncoated 100% Recycled.<br>To produce 750 28pp A4 sheets out of 460X320.<br>5,250 stock sheets.<br>Packed in 500's. | Pre Flight Check<br><br><br>Proof Check |

| Press Information | | | | Pre-press |
|---|---|---|---|---|
| Section | Detail | Size | Qty | Artwork supplied by email.<br>Send proofs to<br>jdoe@example.com |
| Cover | 250 gsm Uncoated 100% Recycled | 320X460 | 840 | |
| Text | 120 gsm Uncoated 100% Recycled | 460X320 | 5600 | |

| Finishing | Outwork | Dispatch |
|---|---|---|
| | | |

```
<div class="pos" id="*133:108" style="top:133;left:108"><span id="*57" style="font-
style:normal;font-weight:700;font-size:57px;font-family:Arial;color:#FFFFFF;"> Job #
1234567 – Part 1 of 1 – Estimate # 12345</span></div>
```

```
<job-description>Job Name: Example Print Job Finished Size:5.65 x 11 Paper: Futura
100# Gloss Cover Inks Color: 4/4 Pre-press:Digital Proof-Mockup, Indigo Finishing:
Cutting, Scoring-Fold, Double </job-description>
```

```
<job-number>1234567</job-number>
<estimate>12345</estimate>
<customer> Company X, Ltd.</customer>
<job-name> Example Print Job </job-name>
<item-description> Example Print Job </item-description>
<contact>John Doe</contact>
<telephone-fax> 01234 098 765</telephone-fax>
<type>Print Proof</type>
<proof-due>06/01/12 9:00 AM</proof-due>
<job-due>09/14/12 3:00 PM</job-due>
```

FIG. 8

DATA TRANSFER SYSTEM, METHOD OF TRANSFERRING DATA, AND SYSTEM

PRIORITY

The present application is a national stage filing under 35 U.S.C. §371 of PCT application number PCT/EP2013/057472, having an international filing date of Apr. 10, 2013, the disclosure of which is hereby incorporated by reference in its entirety.

BACKGROUND

In manufacturing environments, various information technology (IT) systems may be used for in-plant process control, as well as financial handling and business transactions. Production management and process optimization tools are available, and an API (Application Programming Interface) may be provided to facilitate transfer of data between the process control system and the production management system. In printed product production, for example, a print service provider may provide in-plant process control, etc. and may communicate with a production management system via an API.

BRIEF DESCRIPTION OF THE DRAWINGS

Embodiments of the invention are further described hereinafter with reference to the accompanying drawings, in which:

FIG. 5b shows an example of html code representing a part of the job ticket of FIG. 5a.

FIG. 8 shows an example of extracted and formatted parameters based on the example of FIG. 5a.

DETAILED DESCRIPTION

A print service provider may define a work flow for a job. Each job may have a different work flow. A production manager may collect data on all jobs from the print service providers, and may provide optimization tools to organize work flows and allocate resources to jobs. In some examples the job is a print production job. As used herein, the term "print production job" is used herein to describe a set of work, e.g. for a customer, and in some cases may include various information related to associated processing steps to produce one or more printed products. In comparison, the term "print job" is used herein to describe an electronically stored document (or similar) that is to be printed and is in a print-ready form. A print job may be a document in a print queue or a document that is to be added to a print queue, for example.

Within a single site there may be various equipment with respective IT systems for process control. The systems may make use of different software, possibly in a variety of programming languages. Where the same basic software is used on two or more systems, different software versions may be in use. Preparing an API for each IT system can require considerable resources, particularly for older systems which may be unsupported.

Some process control systems generate a job ticket describing a particular job. A job ticket may contain the basic information of the product and all other information required by the employees for producing the job. For example, in printed product production, a job ticket may be produced for each job. A job ticket may describe a type of job or product (e.g. "business card" or "booklet"), process control information (e.g. quantity, page size, finishing, substrate, etc.), customer information (e.g. contact details, etc.), delivery details (address, due date, etc.), production steps (such as pre-processing, binding, etc.), or special finishes. This list is not exhaustive, and other information may be provided on a job ticket.

Figure 1:
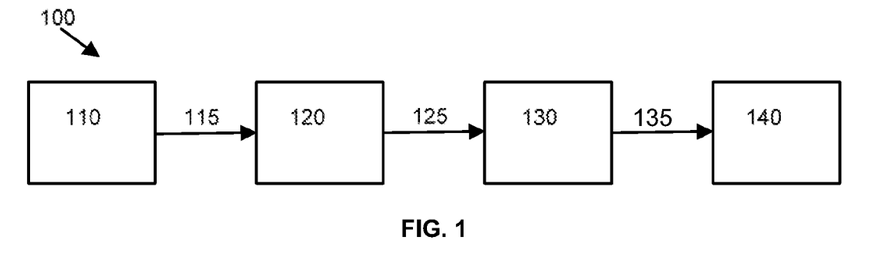
FIG. 1 shows an example of a management system according to an example.

FIG. 1 shows an example of a management system 100 according to an example. The system includes a service provider IT system 110, which may be a legacy system. The service provider IT system generates a job ticket 115, describing details of a job to be fulfilled. The job ticket 115 may be in the form of a print job, and can be sent to a printer to provide a hard copy of the job ticket.

The job ticket 115 is received by a virtual printer driver 120, and an electronic document 125 is generated based on the job ticket 115. The electronic document 125 is representative of the job ticket 115. The electronic document 125 may be a file including instructions that, when interpreted (e.g. by a computer or processor), provide a visual representation of the job ticket 115, e.g. suitable for display on a screen. In some examples the electronic document 125 may be a pdf (portable document format) file. The virtual printer driver may be of-the-shelf software, such as the Amyuni pdf printer driver.

In some examples, the job ticket 115 may also be printed by a hardware printer to generate a hard copy of the job ticket 115. However, in some examples no hard copy of the job ticket 115 is produced.

The electronic document 125 is provided to extraction module 130 to extract parameters from the electronic document 125. The parameter(s) extracted from the electronic document 125 are put into a format (e.g. file type and arrangement) that can be interpreted by production manager 140, and the formatted parameter(s) 135 are then passed to the production manager 140. In some examples, the formatted parameter(s) are in XML (Extensible Markup Language) format.

Much or all of the information required by the production manager 140 may be provided in the job ticket 115. According to the above example, the information in the job ticket can be provided to the production manager 140 without requiring an API between the service provider system 110 and the production manager 140. Thus, according to some examples it is possible to avoid the high expenditure of resources and the long integration time associated with producing an API.

Figure 2:
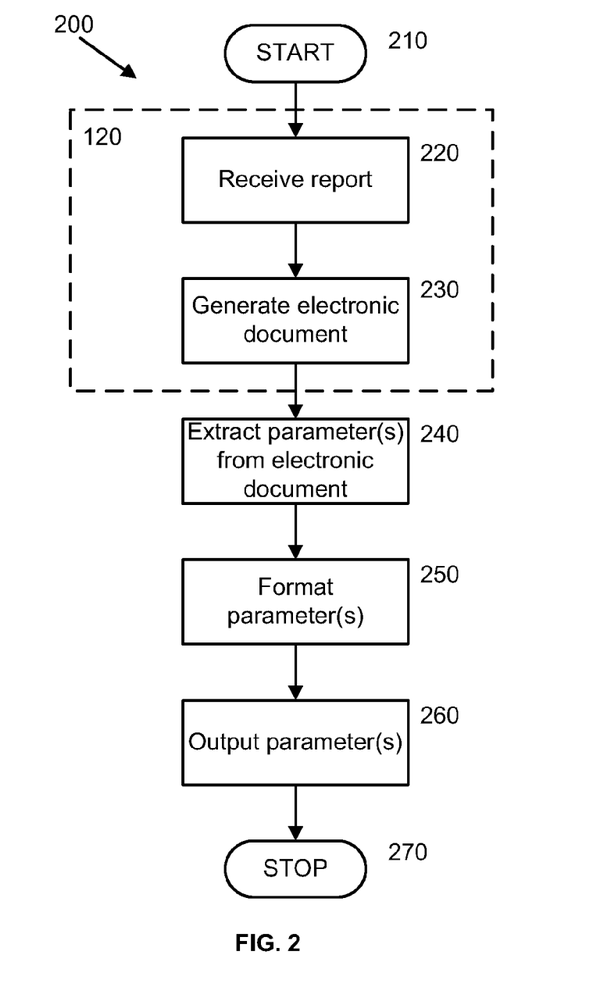
FIG. 2 shows an example of a method according to an example.

FIG. 2 shows a method 200 according to an example. The method begins at 210. At 220 a virtual printer driver 120 receives a job ticket 115, and generates an electronic document 125 at 230. At 240, parameter(s) are extracted from the electronic document, and at 250 the parameter(s) are formatted. The formatted parameter(s) 135 are output at 260, and the method terminates at 270.

Figure 3:
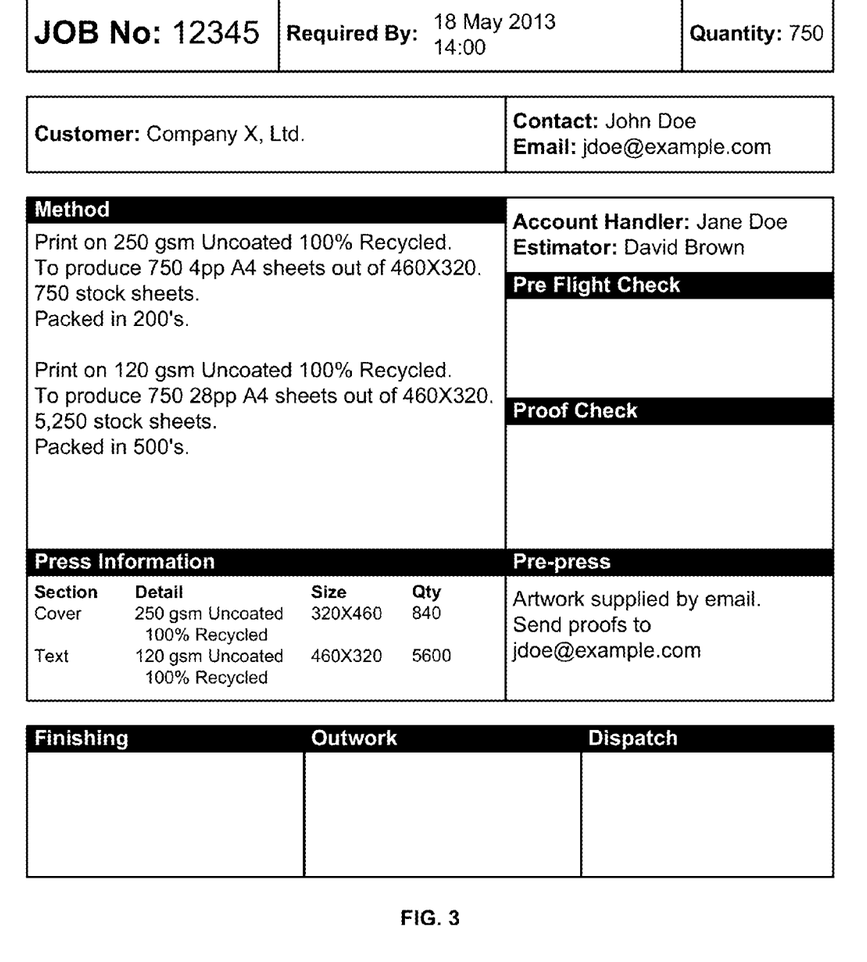
FIG. 3 shows an example of a job ticket for use in a print production process.

FIG. 3 shows an example of a job ticket for use in a print production process, the job ticket describing the print production job. The job ticket may include, for example:

Customer information, such as a customer name, contact details, etc.

Customer account information, such as an account handler, account number, etc.

Job information, such as a job number, job title, due date, quantity, etc.

Printing/process information, such as a printing/processing method, page sizes and numbers, finishing information (e.g. relating to folding, stitching, stapling, etc.), pre-press information, substrate information, etc.

Delivery/dispatch information, such as delivery address, delivery method, due dates, etc.

Quality control information, such as pre flight check information, proofing information, etc.

Figure 4:
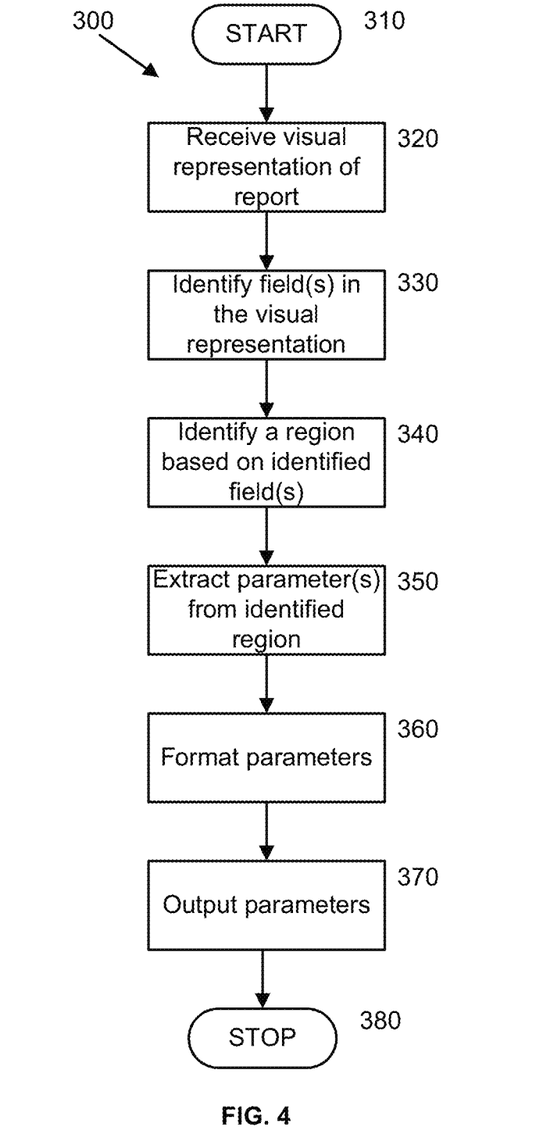
FIG. 4 shows an example of a method performed by an extraction module.

FIG. 4 shows an example of a method 300 performed by extraction module 130. The method begins at 310. At 320 the extraction module 130 receives a visual representation of a job ticket 115 (e.g. the electronic document 125 generated by the virtual printer driver 120). At 330 a field in the visual representation can be identified, and at 340 the identified field can be used to identify a region of the visual representation. At 350 a parameter can be extracted from the identified region. The extracted parameter can be formatted at 360 and output at 370 (e.g. to the production manager 140). The method terminates at 380.

As described in more detail below, the fields and/or parameters may be identified based on keywords, location, format, or other indicators.

In some examples, keywords may include headings (e.g. section headings, field titles, etc). In some examples, the keywords may include words that are the same on each job ticket of a particular format, and do not change from instance to instance of the job ticket (e.g. field titles that do not correspond to variable data or parameters).

In some examples, the same or similar keywords are used in job tickets 115 of varying formats. Thus, keywords may be detected by searching for common keywords. A list of common keywords may be pre-generated, and keywords on the list may be searched for. In some examples a custom list of keywords may be generated for a job ticket 115 of a particular format. The custom list may include only keywords needed for that format of job ticket 115. In some examples, the custom list is based on a general pre-generated list, with additional keywords based on the particular job ticket 115.

Figure 5A:
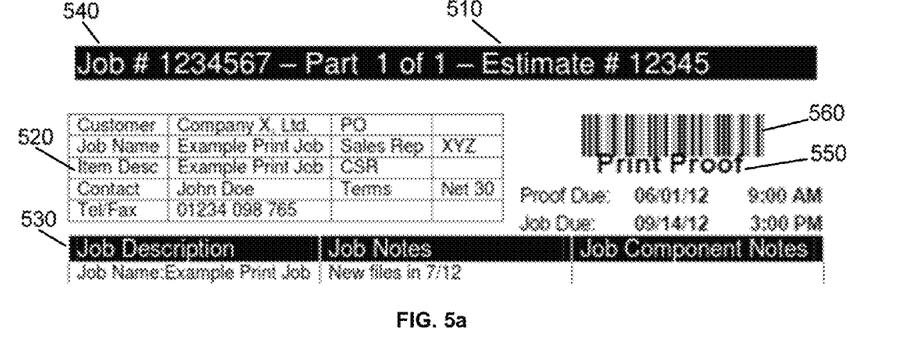
FIG. 5a shows an example of a part of a job ticket.
Figure 5B:
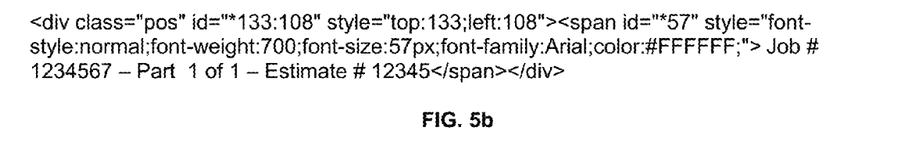

In some examples, format information may be used in identifying fields or keywords. For example, FIG. 5a shows an example of a part of a job ticket 115 in which the text is mainly black on white, while some headings are white on black, with larger text. In this example, keywords may include "Estimate" 510 and "Item Desc" 520, "Job Description" 530. FIG. 5b shows an example of html code representing the top (white on black) line of text. This code includes the text content of this line, along with formatting and position/location information.

Identification of keywords may be simplified by making use of the format information to identify likely candidates for keywords, or to enable searching only of specific parts of the electronic document 125 (i.e. those parts with the relevant format). For example, the format may be pre-determined, according to pre-set rules.

Location information may also be used to identify fields. For example, in FIG. 5a "Job #" 540 is located at the top left of the document. In some examples the location is determined relative to a location of other features of the electronic document 125 (i.e. displayed locations of displayed features, when an image is generated based on the electronic document 125). Relative locations may be more reliable than absolute locations (e.g. defined in fixed units relative to a border of the page) as page size and orientation may vary, and field location and size may vary between instances. In some cases, a job ticket 115 may extend past a single page, and the location of any page breaks may vary between instances. In FIG. 5a, the parameter "Print Proof" 550 is located below bar code 560, and this may be used to identify this parameter.

In some examples the electronic document 125 representing the job ticket 115 may be in a format in which at least some of the textual information on the job ticket 115 is stored as computer-readable textual information (i.e. stored in a format that can be directly interpreted as text by a computer, with the text content of the job ticket encoded as text in the electronic document 125). For example, the electronic document 125 may be in a document markup language, such as html. In some examples, the electronic document may be received by the extraction module 130 in one format and converted to another format prior to extracting the parameters. For example, the electronic document 125 may be received in a pdf format and converted to an html format prior to extracting the parameters. The conversion from pdf to html may make use of a pdf2html command. Thus, in some examples, keyword, format and location information may be determined by searching the text (i.e. the text describing the page formatting and contents) of the electronic document 125, e.g. by using regular expression matching.

In some examples, the electronic document 125 is received by the extraction module 130 in a format in which the text is not directly readable by a computer. In some examples, the extraction module 130 may perform optical character recognition (OCR) on the visual representation of the job ticket 115, as represented by the electronic document 125, to obtain computer readable text from the electronic document 125, the computer readable text being representative of the information in the job ticket 115. The computer readable text resulting from the OCR process may include information on the location and format of the corresponding text in the job ticket 115.

Figure 6A:
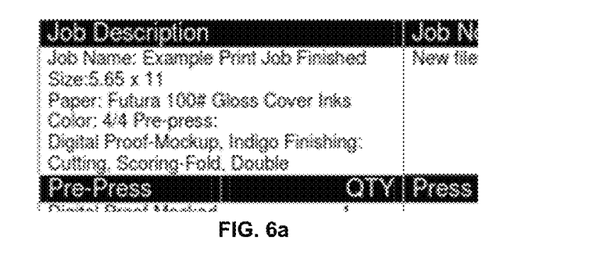
FIGS. 6a and 6b show an example of a part of a job ticket.
Figure 6B:
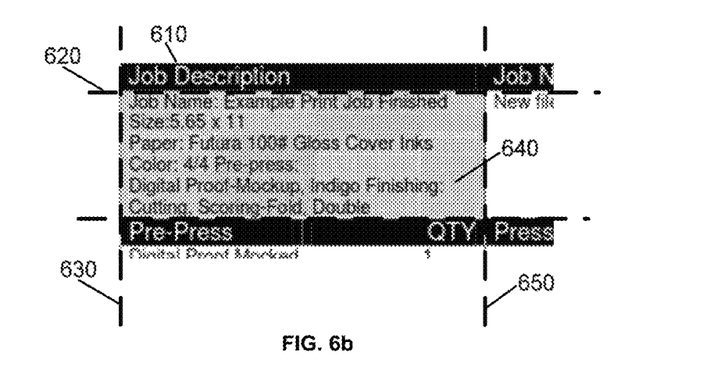

In some examples, the identified keywords and/or other identified features of the visual representation of the job ticket 115 may be used as anchors to define a region of the job ticket 115 from which particular data and/or parameters may be extracted. By way of illustration, FIG. 6a shows an example of a portion of a job ticket 115. The portion shown relates to a job description field. According to this example, the keyword (text string) "Job Description" 610 is searched for, with the format of white text on black (other format information, such as text size and font may also be used). This defines a top left of a region 640, by defining upper 620 and leftmost 630 boundaries of the region 640, as shown in FIG. 6b. In this example, the upper boundary 620 is chosen to be immediately below the text "Job Description" and the leftmost boundary is chosen to be immediately to the left of the text "Job Description". The specifications for placing the boundaries relative to the text "Job Description" may be pre-determined.

The next text string to the right of "Job Description" having the same formatting, in this case "Job N . . . " is chosen to define the rightmost boundary 650 of the region 640.

A lower boundary 660 is set by finding a text string with the same formatting as "Job Description" below "Job Description". In this case, the lower boundary 660 is determined by the text "Pre-Press". The upper 620, lower 660, leftmost 630 and rightmost 650 boundaries define region 640, shown shaded in FIG. 6b.

Figure 6C:
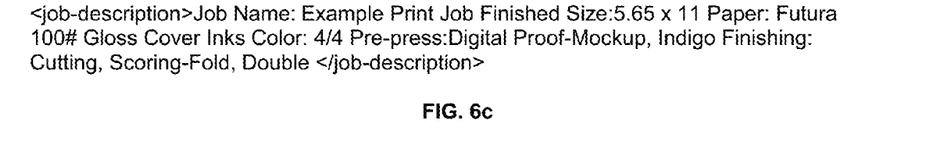
FIG. 6c shows an example of extracted information.

After a region 640 has been determined, parameters (data) relating to a particular field (in the example of FIG. 6b, parameters relating to the "Job Description" field) may be extracted. The extraction may include filtering out all text that is not within the region 640, and sorting the remaining strings (i.e. those in the region 640). For example the text strings in the region 640 may be sorted from top to bottom and then left to right. FIG. 6c shows an example of the extracted information. The order of sorting may be dependent, for example, on a direction of writing in the language of the print ticket 115.

When the parameters (data) have been extracted, they may be formatted in a manner that may be understood by the management system 140 (e.g. in XML format), and then passed to the management system 140.

In some examples, an algorithm is used to extract the parameters from the electronic document 130. In some examples, the algorithm may be in the form of a script, such as a PERL script. In some examples, a set of rules may be defined or determined (e.g. a set of rules for each site, each customer, or each job ticket format). The rules may be stored in a rules file, and the algorithm may access the rules file to allow identification and extraction of parameters from job ticket formats that the rules file corresponds to. The rules file may be in XML format, for example. The rules file may define keywords and boundaries for regions from which parameters are to be extracted. For example, the rules may define boundaries in a similar manner to the example given in FIGS. 6a and 6b. The rules may be based on keywords and formatting, and may define locations of boundaries relative to matched keywords/formatting. The rules file may specify fields that are to be extracted from the job ticket.

In some examples, the algorithm may be general, such that the same algorithm may be applied to essentially any job ticket 115, and a suitable rules file is created for each format of job ticket that is to be processed.

Figure 7:
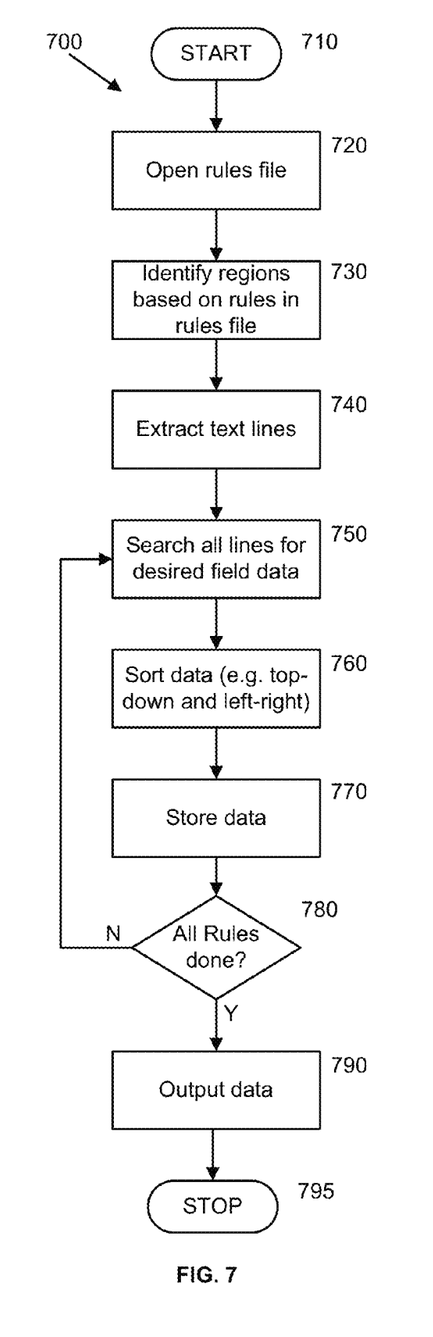
FIG. 7 shows a method performed by an extraction module.

FIG. 7 shows a method 700 performed by an extraction module according to an example. The method begins at 710, and at 720 a relevant rules file is opened or accessed. At 730 the rules in the rules file are applied to identify regions including parameters to be extracted. At 740 the text strings in the identified regions are extracted. The extracted text strings are searched, at 750, for field data (e.g. field data defined by the rules file). The data matching the search criteria are sorted at 760, and the sorted data are stored at 770. Step 780 determines whether any further rules are to be applied, and steps 750 to 780 are repeated until all rules have been applied to the electronic document 125. The stored data is then output at 790, and the method terminates at 795. In some examples the method may include converting the format of the electronic document, such as converting a received pdf document to html, and performing the remaining steps on the html document. Such a conversion step may precede other operations on the electronic document 125 by the extraction module 130, e.g. before 730 in the example of FIG. 7. The storing in 770 may include storing the parameters in XML format. Similarly, the outputting at 790 may include outputting in XML format. The outputting 790 may include providing the formatted parameters to management system 140.

Figure 8:
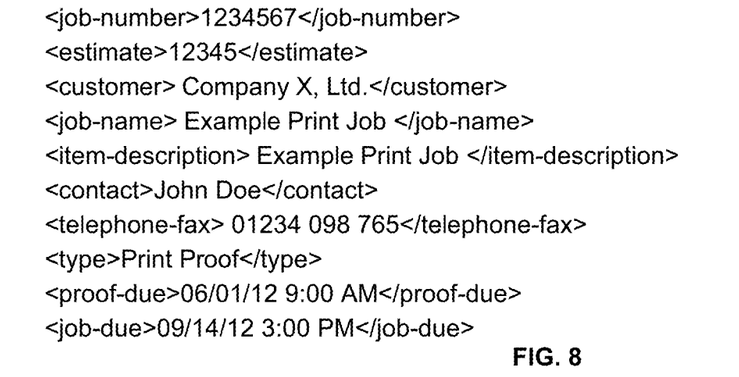

FIG. 8 shows an example of extracted and formatted parameters based on the example of FIG. 5a.

More generally, in the examples described herein, service provider system 110 may be a first system and production manager 140 may be a second system. The examples herein relate to print production, but some examples may be applied to other production processes and applications The examples herein make use of a job ticket 115, but more generally any suitable report may be used. A report may include information on a production process. In some examples a report may include, in print-ready form, information to be passed from one system to another system.

According to some examples, it is possible provide, to a second system, data or parameters from a first system (e.g. a legacy system) that is arranged to generate a printed output, without requiring an API. This may provide significant reduction in effort and resources associated with providing communication between the two systems. Generating an API may take many weeks of skilled work, whereas generation of a rules file may take only a couple of hours.

The electronic document may be in a format other than a pdf format. For example, the electronic document may be in a postscript (ps) format, an image format (bitmap, jpeg, tiff, etc), or a document markup language (e.g. html, TeX, etc).

Identifying keywords, format and location may include parsing computer readable text strings representing formatting and text content, such as an html description (electronic document) of the job ticket 115.

A device according to some examples may be embodied by a processing device, such as a CPU, dedicated computing device, personal computer, laptop computer, tablet computer, etc. Methods of some examples may be executing instructions using such a processing device. Methods according to some examples may be implemented in software or firmware, or in a combination of both. According to some examples, instructions to cause a processing device to perform a method of an example may be stored on a non-transient computer-readable storage medium, such as an optical disc, hard disc, flash drive, etc.

Throughout the description and claims of this specification, the words "comprise" and "contain" and variations of them mean "including but not limited to", and they are not intended to (and do not) exclude other additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A non-transitory computer readable medium storing instructions that when executed cause a processor to:
    receive a visual representation of a report describing a print job from a virtual printer driver, wherein the virtual printer driver is to receive the report describing the print job from a first system and to generate an electronic document that provides the visual representation of the report;
    identify format information in the visual representation of the report;
    use the format information to identify a heading in the visual representation of the report and a keyword in the heading in the visual representation of the report;
    use the identified keyword as an anchor to determine boundaries of a region in the visual representation of the report;
    extract a parameter from the region;
    format the parameter in a first format; and
    provide the parameter in the first format to a second system.

2. The non-transitory computer readable medium of claim 1, wherein the visual representation of the report is a portable document format (PDF) file.

3. The non-transitory computer readable medium of claim 1, wherein the instructions are to cause the processor to identify location information in the visual representation of the report.

4. The non-transitory computer readable medium of claim 1, wherein the report, when printed, is to include a textual description of the parameter.

5. The non-transitory computer readable medium of claim 1, wherein the first system is a print service provider, the report describes a print production job, and the second system is a production manager.

6. The non-transitory computer readable medium of claim 1, wherein the report is a job ticket.

7. A system comprising:
    a processing device;
    a virtual printer driver to receive a report describing a print job from a print service provider, and to generate an electronic document that provides a visual representation of the report;
    an extraction module including instructions that when executed cause the processing device to identify format information in the visual representation of the report, use the format information to identify a heading in the visual representation of the report and a keyword in the heading in the visual representation of the report, use the identified keyword as an anchor to determine boundaries of a region in the visual representation of the report, extract a parameter from the region, and format the parameter in a first format; and
    a production manager to receive the parameter in the first format from the extraction module.

8. The system of claim 7, wherein the visual representation of the report is a portable document format (PDF) file.

9. A method of transferring data, the method comprising:
    receiving, at a virtual printer driver, a report describing a print job from a first system;
    generating, by the virtual printer driver, an electronic document that provides a visual representation of the report;
    identifying format information in the visual representation of the report;
    using the format information to identify a heading in the visual representation of the report and a keyword in the heading in the visual representation of the report;
    using the identified keyword as an anchor to determine boundaries of a region in the visual representation of the report;
    extracting a parameter from the region;
    formatting the parameter in a first format; and
    providing the parameter in the first format to a second system.

10. The method of claim 9, wherein the visual representation of the report is a portable document format (PDF) file.

11. The method of claim 9, wherein the report, when printed, is to include a textual description of the parameter.

12. The method of claim 9, wherein the first system is a print service provider, the report describes a print production job, and the second system is a production manager.

* * * * *